United States Patent Office 2,824,115
Patented Feb. 18, 1958

2,824,115

TITANIUM AND ZIRCONIUM ORGANIC COMPOUNDS

Harry H. Beacham, Plainfield, and Daniel F. Herman, Orange, N. J., assignors to National Lead Company, New York, N. Y., a corporation of New Jersey No Drawing. Application November 9, 1954
Serial No. 467,875

6 Claims. (Cl. 260—429.5)

This invention relates to organometallic compounds. More specifically, it relates to organometallic esters of certain aminoalcohols as hereinafter described. Still more specifically, it relates to the titanates and zirconates of said aminoalcohols. This is in part a continuation of our copending application Serial No. 291,997, filed June 5, 1952.

An object of this invention is to provide novel organotitanium and organozirconium compounds. Another object of this invention is to provide organic compounds of titanium and zirconium which are soluble both in water and in common organic solvents. Other objects and advantages will be apparent from the following more complete description and claims.

Broadly, this invention contemplates a chemical compound comprising an ester of an element from the group consisting of titanium and zirconium, and an aminoalcohol having the general formula:

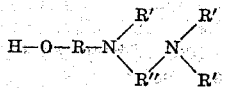

in which the R group is selected from the group consisting of ethylene and alkyl-substituted ethylene radicals, at least one of the R′ groups is selected from the group consisting of β-hydroxyalkyl and β-aminoalkyl radicals and the remaining R′ groups are selected from the group consisting of β-hydroxyalkyl and β-aminoalkyl radicals and hydrogen, and R″ is selected from the group consisting of divalent alkylene radicals containing from 1 to 3 carbon atoms and divalent alkylene amine radicals representable by the formula:

where n is from 1 to 2 and X is selected from the group consisting of hydrogen, alkyl hydrocarbon groups containing from 1 to 3 carbon atoms, β-hydroxyalkyl and β-aminoalkyl radicals.

The preferred and most useful compounds of this invention contain more than one aminoalcoholic hydroxyl group for each titanium atom, and for each 5 carbon atoms at least one group selected from the class consisting of hydroxyl and amino groups, said hydroxyl or amino group being present as a substituent in an R′ group of the above formula.

Among the preferred aminoalcohols for use in the preparation of the compounds of this invention are "Quadrol" (N,N,N′,N′ - tetrakis(2 - hydroxypropyl)ethylene diamine), N,N′,N″-tri(β-hydroxyethyl)diethylene triamine, N,N′-di(β-hydroxyethyl)diethylene triamine, and the like.

While this invention will, for the sake of convenience, be described with particular reference to the titanate esters of the class described, it is to be understood that the description applies equally well, in all material respects, to the corresponding zirconate esters.

All of the compounds of this invention are water-soluble, but those of lower molecular weight exhibit greater solubility than those with higher molecular weights, and it is therefore preferred to use aminoalcohols having no more than about three carbon atoms in each alkyl group of the above formula. Similarly, in the case of mixed alkyl-aminoalkyl titanates, it is preferred to have no more than about three carbon atoms in the alkyl group.

The number of hydroxyl groups in the aminoalcohol molecule has also been found to exert an influence upon water-solubility and it has been found, in general, that a high degree of water-solubility is obtained when there is at least one aminoalcoholic hydroxyl group for each five carbon atoms in the titanate molecule, or more than one aminoalcoholic hydroxyl group for each titanium atom, whichever number of hydroxyl groups is greater. Amino groups as substituents in the alkyl R′ groups of the aminoalcohol appear to exert a solubilizing action similar to that of the hydroxyl groups and may be substituted to some extent therefor. For example, the product produced by the ester interchange reaction of 4 mols of N-(β-hydroxyethyl)diethylene triamine with one mol of tetrabutyl titanate contains less than one hydroxyl group for each five carbon atoms, but is nevertheless highly soluble in water. These substituent amino groups are not entirely equivalent in their effect to hydroxyl groups, however, and it is still preferable to have more than 1 amino-alcoholic hydroxyl group present in the titanate molecule for each titanium atom.

It should be noted that, in all of the foregoing discussion, the number of hydroxyl groups is understood to include those hydroxyls which are esterified with the titanium as well as those, if any, which remain unesterified. This simplification is justified because the total number of hydroxyl (and substituent amino) groups apparently controls the degree of solubility, regardless of whether the hydroxyls are free or esterified to R—O—Ti— configurations.

The water-soluble aminoalcohol titanates of this invention may be prepared in many ways. One of the most convenient of such ways is by a simple ester interchange reaction between an aminoalcohol and an alkyl titanate. While substantially any alkyl titanate may be used in this type of reaction, it is particularly convenient to choose an alkyl titanate which is the orthotitanic acid ester of a relatively low-boiling alcohol, such as, for example, butyl titanate. When such an alkyl titanate is chosen, the aminoalcohol titanate may be prepared by simply mixing the alkyl titanate with the aminoalcohol in a suitable vessel, whereupon an ester interchange occurs with liberation of heat to produce the aminoalcohol titanate in alcoholic solution. If it is desired to isolate the aminoalcohol titanate from the liberated alcohol, this may be accomplished by simply heating to drive off the liberated lower-boiling alcohol. It is often desirable to carry out the reaction and distillation under reduced pressure, as the distillation can then be carried out at a materially lower temperature, thus avoiding the danger of undesirable side reactions. The exact mechanism of the reactions involved is unknown, but the result appears to be a substitution of Ti for H in the first formula in claim 1, and, in some cases a similar substitution of Ti for the H's in the other free hydroxyl groups of R′ and R″, when such are present.

The composition of the aminoalcohol titanate products made according to this method is determined by the quantities of alkyl titanate and aminoalcohol employed. Normal aminoalcohol titanate esters will be produced if the quantity of aminoalcohol is sufficient to provide four alcoholic hydroxyl groups for each molecule of alkyl titanate. If less than this quantity is used, the products produced will be mixed alkylaminoalkyl titanates.

Another convenient method of preparing the water-soluble aminoalcohol titanates of this invention is to react the appropriate aminoalcohol directly with orthotitanic acid. Orthotitanic acid may be prepared, for example, by room temperature hydrolysis of titanium salt solutions followed by filtration and washing to remove soluble hydrolysis products such as acids or salts. The so-produced orthotitanic acid pulp is then mixed with the aminoalcohol and heated until it dissolved. Solubilization of the orthotitanic acid pulp is accompanied by reaction with the aminoalcohol to produce the aminoalcohol titanate products of this invention. The aminoalcohol titanates produced according to this procedure normally have slightly condensed structures, containing Ti—O—Ti linkages to satisfy at least some of the titanium valencies not satisfied by aminoalkoxy groups. They are still, however, water-soluble, and especially so if their composition includes the preferred number of aminoalcoholic hydroxyl groups, etc., as specified above. In this connection it should be pointed out that while R—O—Ti groups are counted as esterified aminoalcoholic hydroxyl groups (R here standing for the aminoalkyl group), Ti—O—Ti linkages are not included in this computation. The novel products of this invention, therefore, also include partially condensed aminoalcohol titanates, that is polymeric products containing titanium atoms linked together by oxygen atoms.

These condensed compositions may also be prepared by reaction of the aminoalcohols as above described with condensed alkyl titanates which have been prepared by partial hydrolysis of ordinary monomeric alkyl titanates. Such condensed titanates may be prepared for example by the addition of small quantities of water to the ordinary alkyl titanates.

A particularly convenient method of preparation of condensed aminoalcohol titanates is to react alkyl titanates with aminoalcohols in the presence of water.

Condensed aminoalcohol titanates produced in any of these ways are similar in characteristics to the ordinary aminoalcohol titanates except that they tend to be somewhat more viscous and in general less reactive.

Also to be considered within the scope of the present invention are polymeric compositions which tend to be formed by reason of the polyfunctionality of both the titanium and the aminoalcohol. Because most of the aminoalcohols herein contemplated have at least two aminoalcoholic hydroxyl groups, there arises the possibility that the various hydroxyls of a given aminoalcohol molecule will be linked to different atoms of titanium. Since titanium is polyvalent, each of the atoms thereof linked to a given aminoalcohol nucleus is capable of being linked to additional aminoalcohols. By repetition, complex chains or cross-linked structures may be set up. The resulting polymers, although not as rapidly soluble in water as the monomers or slightly polymerized structures, nevertheless do dissolve to a very considerable extent. The term "water-soluble" as used herein is understood to mean that compounds or compositions so described are capable of forming aqueous solutions, and the term is understood to exclude substance which, like ethyl, propyl and butyl titanates, for example, are spontaneously hydrolyzed in the presence of water.

The following examples are presented to further illustrate the nature and preparation of the aminoalcohol titanates of this invention.

*Example I*

29.2 parts of "Quadrol," N,N,N',N'-tetrakis(2-hydroxypropyl) ethylene diamine, were added to 56.8 parts of tetraisopropyl titanate, corresponding to a molar ratio of 1:2 "Quadrol" to isopropyl titanate. The addition was carried out slowly with stirring and considerable heat was liberated. Most of the liberated isopropyl alcohol was driven off by the heat of reaction. The remaining product was a viscous lemon-yellow oil consisting essentially of "Quadrol" titanate, probably containing various molecular species including excess unreacted "Quadrol." The liquid was soluble in benzene, mineral spirits, butanol, and in water, the latter forming an aqueous solution having a pH of 7. This liquid "Quadrol" titanate was diluted to a 1% solution in water and used as a dispersing agent for an acidic aqueous slurry of titanium dioxide pigment. One volume of the dilute solution added to approximately 100 volumes of 10% pigment slurry at pH 5 was found to effectively disperse the pigment in the aqueous medium.

*Example II*

The procedure of Example I was repeated except that only half the quantity (i. e. 28.4 parts) of isopropyl titanate was used, corresponding to a molar ratio of 1:1 "Quadrol" to isopropyl titanate. The resulting product was a viscous light-yellow oil similar in appearance to the product of Example I and having similar solubility characteristics. This product may be considered essentially a "normal" "Quadrol" titanate although again it is probable that several molecular species were present including residual isopropoxy groups on some titanium atoms and unreacted "Qaudrol" hydroxyl groups. Upon standing several hours the product solidified to a semi-crystalline buttery consistency. The solid product was soluble in water and butanol, but insoluble in benzene and mineral spirits. This change in state of aggregation and solubility characteristics was ascribed to a gradual rearrangement of the ester linkages to form more sterically stable configurations involving polymeric molecular species. Such rearrangement is of course possible because of the polyfunctionality of both the titanium atom and the "Quadrol" molecule. Having undergone this inversion, the product remained unchanged in appearance and properties for several weeks.

*Example III*

The procedure of Example I was again repeated, but using a 2:1 ratio of "Quadrol" to isopropyl titanate, i. e. 58.4 parts "Quadrol" and 28.4 parts isopropyl titanate. An appreciable amount of heat was liberated upon mixing, although not so much as in Examples I and II. The product was similar to those obtained in Examples I and II except that it was somewhat less viscous, and contained a larger amount of residual liberated isopropanol. The solubility characteristics of the product were similar to those of the freshly-prepared products of Examples I and II, as was its dispersing power for aqueous pigment slurries. Although some polymerization and crystallization took place upon standing, the bulk of the product remained liquid and apparently unchanged for a period of several days, the solidification being limited to a slight deposit of crystalline material.

*Example IV*

23.3 parts of zirconium tetrachloride were dissolved in approximately 200 ml. of water and the resulting aqueous solution was added with stirring to 29.2 parts of "Quadrol." Heat was evolved. The solution was cooled to 25° C. and 16 parts of sodium hydroxide dissolved in 100 ml. of water were added with cooling. A clear solution of "Quadrol" zirconate, having a pH of 9, resulted.

*Example V*

The procedure of Example I was repeated, substituting for the "Quadrol" 127.2 parts of N-(β-hydroxyethyl)diethylene triamine prepared by reaction of one mol of ethylene oxide with one mol of diethylene triamine. On removal of the isopropyl alcohol under reduced pressure, the product, N-(β-hydroxyethyl)diethylene triamine titanate, remained as a clear light-yellow oil which formed stable solutions in water, giving a pH of 8.5. The product was also soluble in ethyl alcohol, acetone and dioxane.

*Example VI*

The procedure of Example I was again repeated substituting for the "Quadrol" 47 parts of N,N,N″ tri(β-hydroxyethyl) diethylene triamine. The product was a light-colored oil which crystallized partially on standing. Aqueous solutions of the titanate had a pH of 9 and did not hydrolyze at room temperatures but did so on boiling.

Example VII 103 parts of diethylene triamine were diluted with 500 parts of benzene and the solution cooled to 5° C. 88 parts of ethylene oxide were passed into the cold solution, the reaction temperature being maintained at 25° C. or below. After the addition was completed the reaction mixture was refluxed gently for 1 hour, after which the benzene was stripped off leaving 190 parts of a light-yellow oil. The residual oil consisted essentially of a mixture of isomeric di-(β-hydroxyethyl)diethylene triamines having an apparent average molecular weight of approximately 185. The deviation of this value from theoretical for the isomers (192) was ascribed to the inclusion in the mixture of some residual low-boiling compounds.

37 parts of the oil were used in place of the "Quadrol" of Example I. The residual light-yellow oily product was soluble in water, ethanol and dioxane.

The compounds of the present invention may be described generically as the titanate and zirconate esters of aminoalcohols characterized by at least two nitrogen atoms linked through a divalent alkylene group, said two nitrogen atoms having between them a β-hydroxyalkyl substituent and at least one other substituent selected from the group consisting of β-hydroxyalkyl and β-aminoalkyl radicals. They are in general soluble both in water and in common organic solvents to form stable solutions, and are useful as dispersing agents, as additives to paint and varnish formulations to improve the durability and hardness of the films produced, for the treatment of wool and animal fibers to improve the properties thereof, and in various textile and cosmetic applications.

While this invention has been described and illustrated by the examples shown, it is not intended to be strictly limited thereto, and other variations and modifications may be employed within the scope of the following claims.

We claim:

1. A water soluble ester of an element from the group consisting of titanium and zirconium with an aminoalcohol having the general formula:

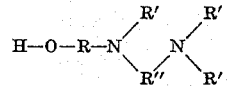

in which the R groups are selected from the group consisting of ethylene and lower alkyl-substituted ethylene radicals, at least one of the R' groups is selected from the group consisting of β-hydroxy-lower alkyl and β-amino-lower alkyl radicals and the remaining R' groups are selected from the group consisting of β-hydroxy-lower alkyl and β-amino-lower alkyl radicals and hydrogen, and R" is selected from the group consisting of divalent alkylene radicals containing from 1 to 3 carbon atoms and divalent alkylene amine radicals representable by the formula:

where $n$ is from 1 to 2 and X is selected from the group consisting of hydrogen, lower alkyl hydrocarbon groups containing from 1 to 3 carbon atoms, β-hydroxy-lower alkyl and β-amino-lower alkyl radicals.

2. N,N,N',N' - tetrakis (2 - hydroxypropyl)ethylenediamine titanate.

3. N,N,N',N' - tetrakis(2 - hydroxypropyl)ethylenediamine zirconate.

4. N - (β - hydroxyethyl)diethylenetriamine titanate.

5. N,N',N" - tri(β - hydroxyethyl)diethylenetriamine titanate.

6. N,N'-di(β-hydroxyethyl)diethylenetriamine titanate.

References Cited in the file of this patent

UNITED STATES PATENTS 2,579,414     Boyd                 Dec. 18, 1951